US011261789B2

(12) United States Patent
Menheere et al.

(10) Patent No.: US 11,261,789 B2
(45) Date of Patent: Mar. 1, 2022

(54) INERTIAL PARTICLE SEPARATOR FOR TURBINE ENGINE

(71) Applicant: PRATT & WHITNEY CANADA CORP., Longueuil (CA)

(72) Inventors: David Menheere, Norval (CA); Santo Chiappetta, Georgetown (CA); Tim Redford, Campbellville (CA); Daniel Van Den Ende, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/849,508

(22) Filed: Apr. 15, 2020

(65) Prior Publication Data

US 2021/0324797 A1   Oct. 21, 2021

(51) Int. Cl.
*F02C 7/052* (2006.01)
*B01D 45/16* (2006.01)
*B01D 45/06* (2006.01)
*B64D 33/02* (2006.01)

(52) U.S. Cl.
CPC .............. *F02C 7/052* (2013.01); *B01D 45/16* (2013.01); *B01D 45/06* (2013.01); *B64D 2033/0246* (2013.01); *F05D 2260/607* (2013.01)

(58) Field of Classification Search
CPC . F02C 7/05; F02C 7/052; F02C 7/055; B64D 2033/022; B64D 2033/0246; B01D 45/04; B01D 45/06; B01D 45/16
See application file for complete search history.

(56) References Cited

U.S. PATENT DOCUMENTS

| 1,620,241 | A | * | 3/1927 | Stebbins | B04C 1/00 55/397 |
| 1,866,196 | A | * | 7/1932 | Criqui | B01D 47/16 261/90 |
| 3,534,548 | A | | 10/1970 | Connors | |
| 3,993,463 | A | * | 11/1976 | Barr | B01D 45/16 55/306 |
| 10,245,540 | B2 | | 4/2019 | Bisson et al. | |
| 10,450,951 | B2 | | 10/2019 | Rahaim et al. | |
| 10,525,485 | B2 | * | 1/2020 | Monacchio | B01D 45/12 |
| 10,526,090 | B2 | * | 1/2020 | Himmelmann | B01D 45/12 |

* cited by examiner

*Primary Examiner* — Stephanie Sebasco Cheng
(74) *Attorney, Agent, or Firm* — Norton Rose Fulbright Canada LLP

(57) ABSTRACT

An inertial particle separator (IPS) for a gas turbine engine, has: a plenum circumferentially extending about a central axis and defined between an outer wall and an inner wall, the plenum having an inlet facing a circumferential direction relative to the central axis, a radius of the outer wall decreasing in an axial direction relative to the central axis between the inlet and an annular splitter extending circumferentially around the central axis and located downstream of the inlet radially between the outer wall and the inner wall, a particle outlet including an annulus radially between the outer wall and the splitter, an air outlet fluidly connectable to a compressor of the gas turbine engine and defined radially between the splitter and the inner wall.

16 Claims, 3 Drawing Sheets

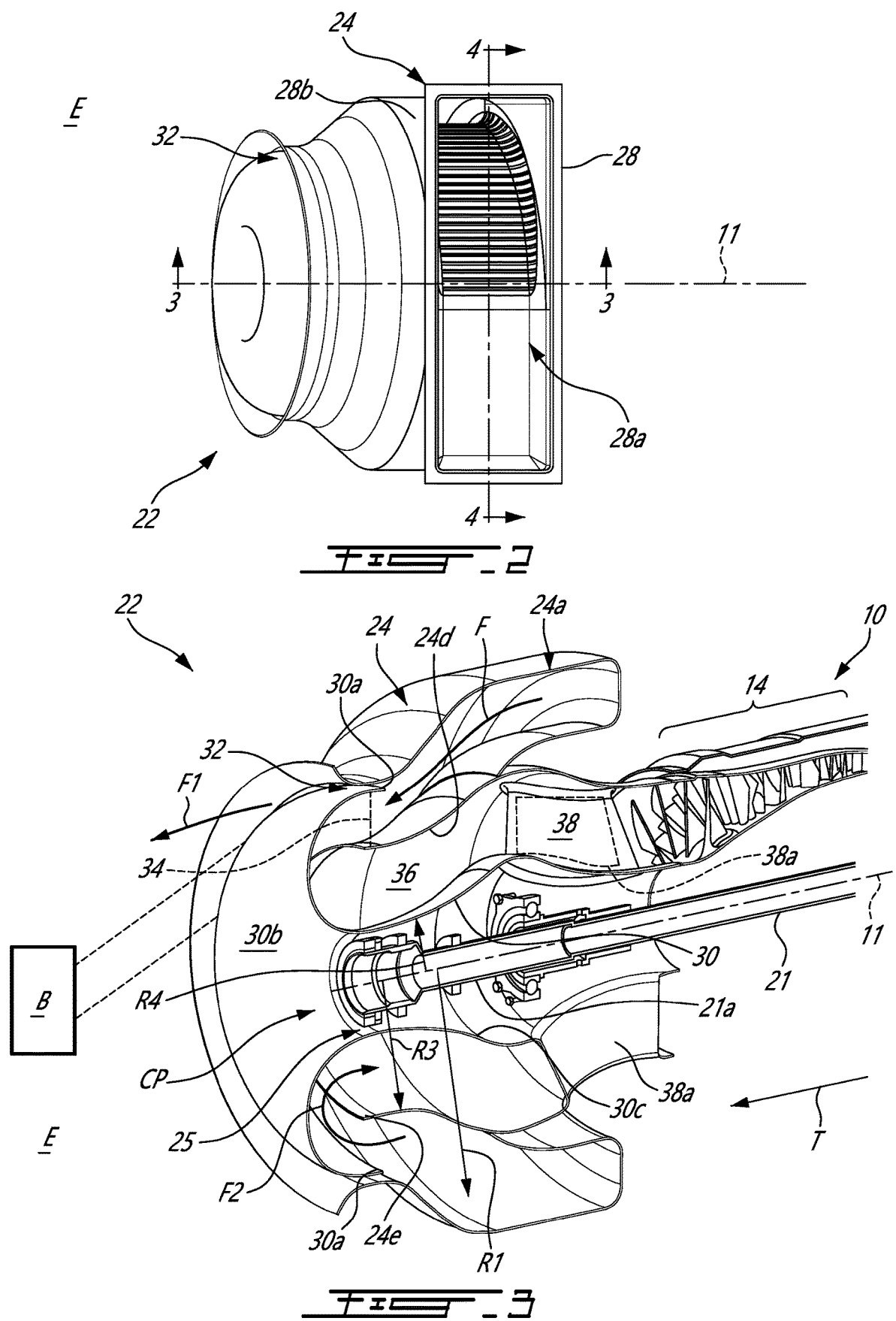

INERTIAL PARTICLE SEPARATOR FOR TURBINE ENGINE

TECHNICAL FIELD

The application relates generally to gas turbine engines and, more particularly, to particle separators used in such engines.

BACKGROUND OF THE ART

In some operating conditions, an airflow entering an inlet of a gas turbine engine may include particles, such as ice and dust. It may be desirable to separate such particles from the air prior to delivering the air to engine components.

SUMMARY

In one aspect, there is provided an inertial particle separator (IPS) for a gas turbine engine, comprising: a plenum circumferentially extending about a central axis and defined between an outer wall and an inner wall, the plenum having an inlet facing a circumferential direction relative to the central axis, a radius of the outer wall decreasing in an axial direction relative to the central axis between the inlet and an annular splitter extending circumferentially around the central axis and located downstream of the inlet radially between the outer wall and the inner wall, a particle outlet including an annulus radially between the outer wall and the splitter, an air outlet fluidly connectable to a compressor of the gas turbine engine and defined radially between the splitter and the inner wall.

In another aspect, there is provided an inertial particle separator (IPS) for a gas turbine engine, comprising a plenum circumferentially extending about a central axis and defined between an outer wall and an inner wall radially inward of the outer wall relative to the central axis, the inner and outer walls circumferentially extending around the central axis, the plenum having an inlet oriented tangentially to the outer wall and facing a direction having a circumferential component relative to the central axis, a radius of the outer wall decreasing in a flow direction between the inlet and an air conduit fluidly connectable to a compressor of the gas turbine engine, an air inlet of the air conduit extending between the inner wall and a splitter wall, a particle outlet defined by an annulus radially between the outer wall and the splitter wall.

In yet another aspect, there is provided a method of separating particles from an airflow with an inertial particle separator (IPS) of a gas turbine engine, the IPS having a plenum annularly extending around a central axis of the gas turbine, the method comprising: receiving the airflow within the plenum in a circumferential direction relative to the central axis; increasing a speed at which the airflow rotate about the central axis within the plenum thereby causing some of the particles to migrate radially away from the central axis; and directing a radially inner portion of the airflow toward a compressor of the gas turbine engine and bleeding a radially outer portion of the flow containing at least some of the particles to an environment outside of the gas turbine engine.

DESCRIPTION OF THE DRAWINGS

Reference is now made to the accompanying figures in which:

FIG. 2 is a schematic side three dimensional view of an inertial particle separator (IPS) in accordance with one embodiment that may be used with the gas turbine engine of FIG. 1;

FIG. 3 is a schematic cutaway view of the IPS of FIG. 2 taken along line 3-3 on FIG. 2.

DETAILED DESCRIPTION

Figure 1:
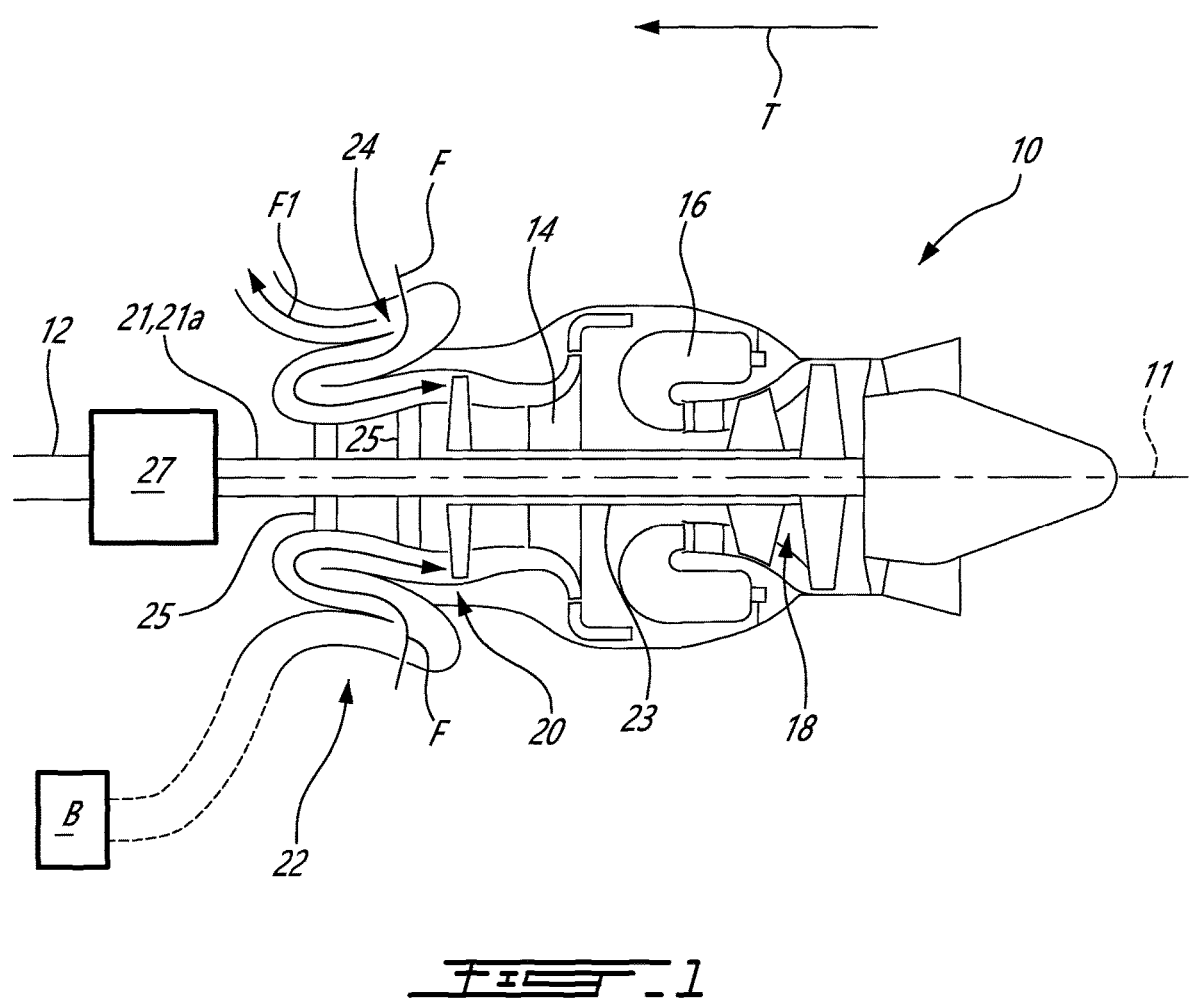
FIG. 1 is a schematic cross sectional view of a gas turbine engine.

FIG. 1 illustrates a gas turbine engine 10 of a type preferably provided for use in subsonic flight, generally comprising in serial flow communication, a compressor section 14 for pressurizing the air, a combustor 16 in which the compressed air is mixed with fuel and ignited for generating an annular stream of hot combustion gases, and a turbine section 18 for extracting energy from the combustion gases. The compressor 14 and the turbine section 18 are rotatable about a central axis 11 of the engine 10. The gas turbine engine 10 has a low-pressure shaft 21 and a high-pressure shaft 23. The low-pressure shaft 21 is drivingly engaged to a gearbox 27. An output shaft 12 is drivingly engaged to the gearbox 27 and may be used to drive a rotatable load, such as a helicopter rotor. In the embodiment shown, the engine 10 is a turboshaft. It will be appreciated that the engine may be other types of engine such as, for instance, a turboprop engine.

As shown in FIG. 1, the engine 10 has an inlet 20 that may extend circumferentially around the central axis 11. In some operating conditions, such as icing conditions, ice particles may be ingested in to the engine 10 via the inlet 20. This may be undesirable. The ingested particles may be dust, sand, ice, etc. To at least partially remove the particles from an airflow F entering the engine 10, an inertial particle separator (IPS) 22 may be used.

Referring now to FIGS. 2-5, the inertial particle separator 22 in accordance with a possible embodiment is shown. The inertia particle separator 22 includes a plenum 24 that receives the airflow F (FIG. 1) from an environment E outside the engine E. The plenum 24 defines an inlet 26 and a particle outlet 32 for expelling the extracted particles back to the environment E.

Figure 4:
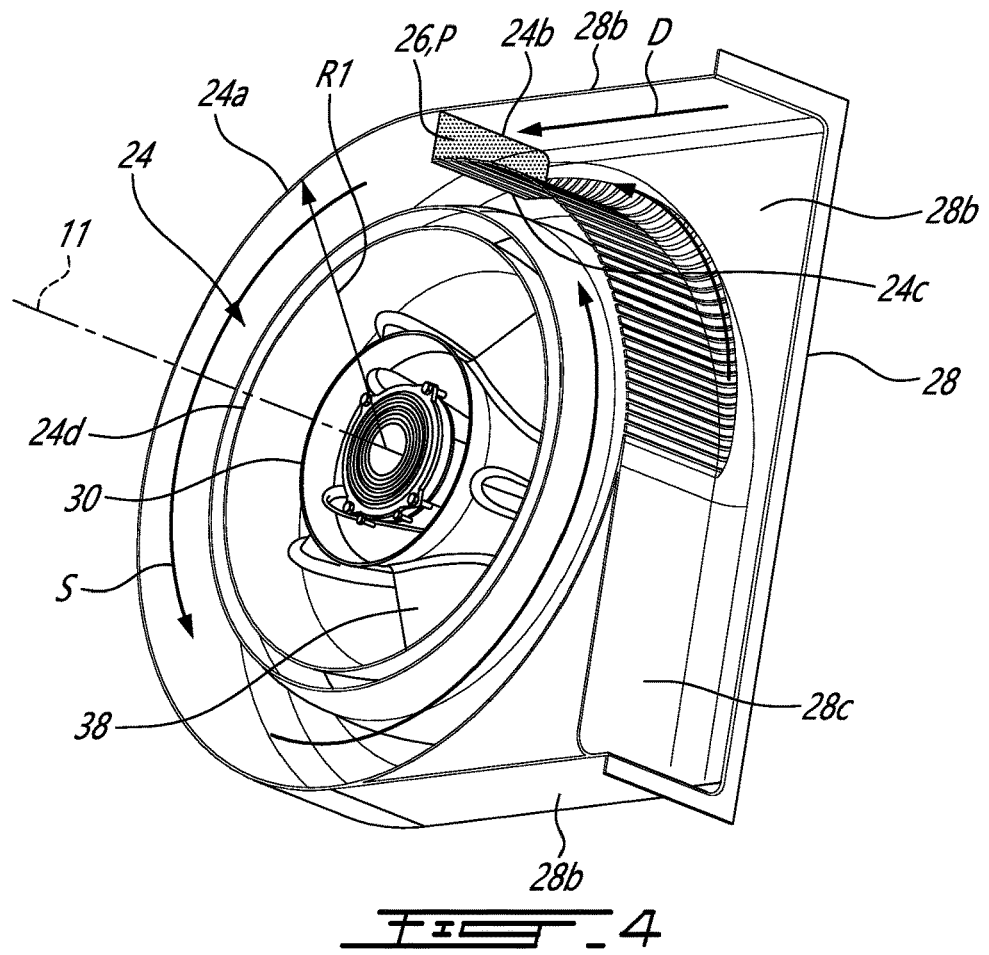
FIG. 4 is a schematic cutaway view of the IPS of FIG. 2 taken along line 4-4 of FIG. 2.

Referring more particularly to FIGS. 3-4, in the embodiment shown, the plenum 24 has an outer wall 24a that defines the inlet 26 of the IPS 22. The outer wall 24a of the plenum 24 extends around the central axis 11 but for the inlet 26. The inlet 26 may be defined in a plane P (FIG. 4) that contains the central axis 11 such that, in use, the airflow F (FIG. 1) enters the plenum in a substantially circumferential direction relative to the central axis 11. In other words, the inlet 26 may be oriented in a circumferential direction relative to the central axis 11. In the embodiment shown, the air enters the plenum 24 via the inlet 26 along direction D (FIG. 4) and may be substantially free of a radial component and may be free of an axial component relative to the central axis 11. As shown in FIG. 3, the air that enters the plenum 24 via the inlet 26 along the direction D enters parallel, or tangentially, to the outer wall 24a of the plenum 24.

The outer wall 24a curves around the central axis 11. Such a shape may induce a swirl, denoted by arrow S in FIG. 4, around the central axis 11. Herein, the swirl S may be considered as a global movement of the flow within the plenum 24 and around the central axis 11 of the engine 10. In the depicted embodiment, the outer wall 24a extends from a first edge 24b to a second edge 24c. As show in FIG. 4, a radius R1 of the outer wall 24a of the plenum 24 decreases in the circumferential direction relative to the central axis 11. The radius R1 decreases from the first edge 24b to the second edge 24c. The first edge 24b is located radially outwardly of the second edge 24c. In the present embodiment, the inlet 26 is contained in the plane P containing the central axis 11. This may be possible by having the first edge 24b circumferentially aligned with the second edge 24c of the outer wall 24a. The inlet 26 may face a direction having a circumferential component relative to the central axis 11. The inlet 26 may face a direction having solely a circumferential component and be free of an axial and radial components relative to the central axis 11. The inlet 26 may face a direction oriented mainly circumferentially relative to the central axis 11.

Figure 5:
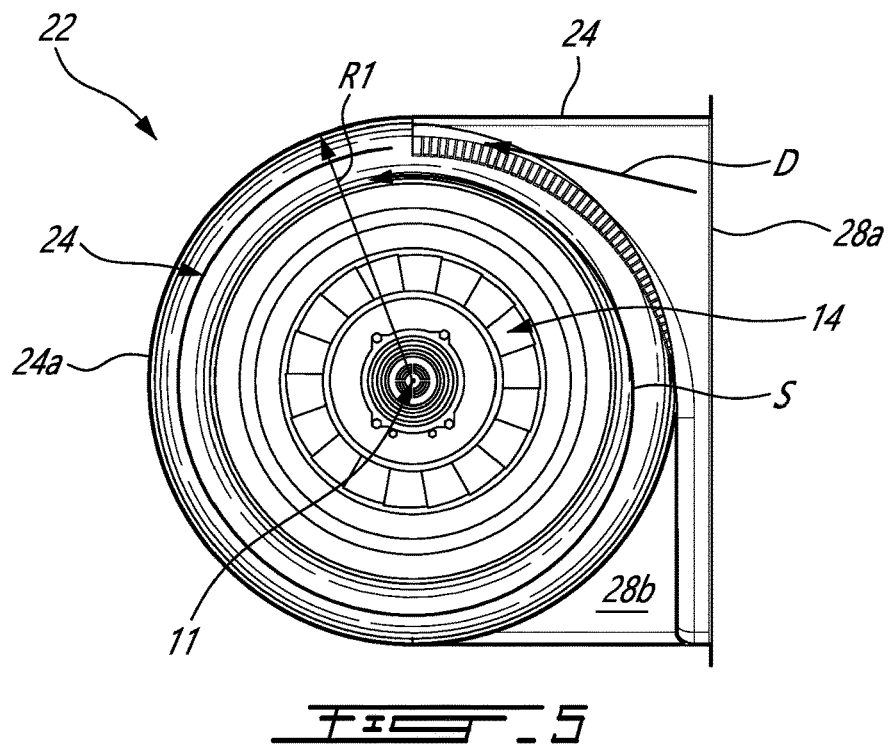
FIG. 5 is the view of FIG. 4 shown at a different angle.

Referring to FIGS. 2 and 4-5, a fairing 28 extends around a portion of the outer wall 24a. The fairing 28 defines an inlet 28a (FIG. 2) that is in fluid communication with the inlet 26 of the plenum 24 and with the environment E. The inlet 28a has a substantially rectangular shape—although other shapes are contemplated—that is defined by four interconnected sidewalls 28b that each extends from the inlet 28a to the outer wall 24a of the plenum 24. The fairing 28 further includes an inner wall 28c (FIG. 4) that extends substantially vertically and that merges with the outer wall 24a of the plenum 24. The fairing 28 may help in guiding the flow entering the inlet 28a toward the plenum 24. More specifically, the inner wall 28c gradually curves toward the inlet 26 and may therefore guide the incoming flow F in a substantially tangential direction relative to the central axis 11. This may help in minimizing aerodynamics losses compared to a configuration without the fairing 28.

Referring more particularly to FIG. 3, once the air has entered the plenum 24, it is swirled around the central axis 11 and flows in the flow direction F that may extend away from the compressor section 14 of the engine 10. In the embodiment shown, the air in the plenum 24 is guided between the outer wall 24a and an inner wall 24d. The inner wall 24d extends circumferentially around the central axis 11. In the depicted embodiment, a radius R1 of the outer wall 24a decreases in the flow direction F. Herein, the radius R1 of the outer wall 24a decreases in the axial direction relative to the central axis 11. This may accelerate a rotational speed of the flow around the central axis 11. A radius R3 of the inner wall 24d may decrease in the flow direction F, which may be the axial direction as shown in FIG. 3. The radius R3 of the inner wall 24d may alternatively increase or remain constant. In a particular embodiment, a mean of radii R1 and R3 may decrease to increase a tangential flow speed. In other words, a decreasing mean radius across flow F, between the inner and outer walls 24d, 24a, may accelerate a rotational speed of the flow around the central axis 11. In the embodiment shown, the airflow circulating in the plenum 24 along the flow direction F is moved toward the central axis 11 and away from the compressor section 14 of the engine 10.

Still referring to FIG. 3, the IPS 22 includes a splitter wall 30 that extends from an edge 30a that is located radially between the outer wall 24a and the inner wall 24b of the plenum 24. The edge 30a defines a splitter dividing the flow circulating into the plenum 24 in two annular flows, namely outer F1 and inner F2 annular flows. The particles, which may be heavier than air, to be extracted from the flow F may migrate radially outwardly away from the central axis 11 and toward the outer wall 24a by swirling the flow around the central axis 11. The decrease in radius R1 of the outer wall 24a may enhance this migration. A concentration of the particles may be greater in the outer annular flow F1 than it is in the inner annular flow F2 because of the migration of the particles in a radially outward direction induced by the swirling motion of the flow in the plenum 24 and/or by the decrease in the radius R1 of the outer wall 24a.

Referring more particularly to FIGS. 2-3, the IPS 22 defines a particle outlet 32 located radially between the edge (or splitter) 30a and the outer wall 24a and an air outlet 34 defined between the edge 30a and the inner wall 24d. The particle outlet 32 may have an annulus shape. The particle outlet 32 may be in fluid flow communication with a blower B that may be operable to create a pressure drop to suction the particles out of the plenum 24. The blower B may be any suitable means able to create such a pressure differential, such as, a fan or an impeller. The blower B may be a scoop configured to, in use, create a pressure drop to suction the particles out of the plenum 24. The outer annular flow F1 may exit the plenum 24 via the particle outlet 32. The inner annular flow F2 may exit the plenum 24 via the air outlet 34.

The air outlet 34 defines an inlet of an air conduit 36 that is fluidly connected to compressor section 14 of the engine 10. In other words, the inner annular flow F2 may be directed toward compressor section 14 of the engine 10 via the air conduit 36. In the disclosed embodiment, a portion of the air conduit 36 is located radially between the inner wall 24d of the plenum 24 and the splitter wall 30. Herein, the splitter wall 30 has a curved portion 30b extending from the edge 30a and a conduit portion 30c extending from the curved portion 30b toward compressor section 14. The curved portion 30b of the splitter wall 30 may have a torus shape, also referred to as a "donut" shape. Hence, the air conduit 36 may curve about 180 degrees to change the direction of the inner annular flow F2 from being directed away from the compressor section 14 in a radially outer portion of the air conduit 36 to being directed toward compressor section 14 in a radially inner portion of the air conduit 36. In other words, the air may flow in a direction of travel T of the gas turbine engine 10 (FIG. 1) within the plenum 24 and flow in a direction opposite the direction of travel T in the air conduit 36 before reaching the compressor section 14. In the embodiment shown, the air conduit 36 curves around an edge 24e of the inner wall 24d such that an axial component of a direction of a flow F in the plenum 24 is opposite to that in the air conduit 36.

The curved portion 30b of the splitter wall 30 curves radially inwardly from the edge 30a and extend toward the central axis 11 and ends radially inwardly of the inner wall 24d of the plenum 24. In the embodiment shown, the splitter wall 30 is supported radially by one or more shafts 21, 23 of the gas turbine engine 10. Bearings 25 may be located between the shaft and the splitter wall 30. A bearing cavity may be defined between the shaft 21 and the splitter wall 30. A seal may be disposed radially between the splitter wall 30 and the shaft 21 for keeping the oil into the bearing cavity. As shown in FIG. 3, the torus shape of the curved portion 30b of the splitter wall 30 defines a central passage CP. The bearings 25 are received within said central passage CP.

The air conduit 36, which is annular and defined radially between the inner wall 24d of the plenum 24 and the splitter wall 30, may have a sinusoidal shape and may extend away from the central axis 11 in a first portion and toward the central axis 11 in a second portion downstream of the first portion relative to the inner annular flow F2 circulating therein. In other words, a radius R4 of the conduit portion 30c of the splitter wall 30 may first increase and then decrease before reaching the compressor section 14. A radius R4 of the conduit portion 30c of the splitter wall 30 may reach a maximum value at an axial location between the air outlet 34 of the air conduit 36 and the compressor section 14. The sinusoidal shape may be used to accommodate a bearing 25. A radius of said bearing may be greater than adjacent bearings because it is a ball bearing designed to transmit axial load from the power turbine. The bearing on a left-hand side of FIG. 3 may be a roller bearing that may not transmit axial load and may act as a guide for a torque tube 21a driving engaging the low-pressure shaft 21 to the gearbox 27. In the embodiment shown, de-swirling vanes 38 are located within the air conduit 30 and extends at least radially across the air conduit 36 relative to the central axis 11. The de-swirling vanes 38 may be located downstream of a location where the radius R4 of the conduit portion 30c of the splitter wall 30 is maximal. The de-swirling vanes 38 may be configured to at least partially remove a circumferential component of the inner annular flow F2 circulating into the air conduit 36. A cross-section of the de-swirling vanes 38 may define a cambered airfoil profile. The de-swirling vanes 38 may be angled relative to the inner annular flow F2. Any configurations that may allow the de-swirling vanes 38 to exert a force on the flow F2 in a circumferential direction relative to the central axis 11 are contemplated. The de-swirling vanes 38 may be hollow. The de-swirling vanes 38 may define passages 38a therein that may be used to transfer oil to and from the bearing 25. In the embodiment shown, the de-swirling vanes 38 are located downstream of a location here the radius R4 of the conduit portion 30c of the splitter wall 30 is maximal.

The inlet 26 may be at right angles to the engine centerline 11 and offset so the air enters tangentially into a circular plenum 24 setting up a cyclonic flow S which may cause heavier particles to migrate to the outer wall 24a of the plenum 24. The plenum 24 may decrease in radius in the flow direction F which may further accelerate the flow and which my improve particle separation. The outer annular flow F1, saturated with particles, may be bleed off through the particle outlet 32 via the scavenge blower B, which may exhaust the flow F1 overboard or into the exhaust. The main flow F2 continues toward the compressor 14 and may be straightened by the vanes 38 before entering the compressor 14.

In a particular embodiment, air may enter the plenum 24 at a plurality of inlets 26 circumferentially distributed around the central axis 11. In other words, the inlets may be positioned circumferentially around the same horizontal engine location. This may improve efficiency since the air could enter the plenum through more than one inlet.

For separating particles from the airflow F, the airflow F is received within the plenum 24 in a circumferential direction relative to the central axis 11; a speed at which the airflow F rotate about the central axis 11 within the plenum 24 is increased thereby causing some of the particles to migrate radially away from the central axis 11; and a radially inner portion of the airflow is directed toward the compressor 14 of the gas turbine engine 10 and a radially outer portion of the flow containing at least some of the particles are directed to the environment E outside of the gas turbine engine 10. In the embodiment shown, increasing the speed includes circulating the airflow F within the plenum 24 having an outer wall 24a decreasing in radius.

Embodiments disclosed herein include:

A. An inertial particle separator (IPS) for a gas turbine engine, comprising: a plenum circumferentially extending about a central axis and defined between an outer wall and an inner wall, the plenum having an inlet facing a circumferential direction relative to the central axis, a radius of the outer wall decreasing in an axial direction relative to the central axis between the inlet and an annular splitter extending circumferentially around the central axis and located downstream of the inlet radially between the outer wall and the inner wall, a particle outlet including an annulus radially between the outer wall and the splitter, an air outlet fluidly connectable to a compressor of the gas turbine engine and defined radially between the splitter and the inner wall.

B. An inertial particle separator (IPS) for a gas turbine engine, comprising a plenum circumferentially extending about a central axis and defined between an outer wall and an inner wall radially inward of the outer wall relative to the central axis, the inner and outer walls circumferentially extending around the central axis, the plenum having an inlet oriented tangentially to the outer wall and facing a direction having a circumferential component relative to the central axis, a radius of the outer wall decreasing in a flow direction between the inlet and an air conduit fluidly connectable to a compressor of the gas turbine engine, an air inlet of the air conduit extending between the inner wall and a splitter wall, a particle outlet defined by an annulus radially between the outer wall and the splitter wall.

Embodiments A and B may include any of the following elements, in any combinations:

Element 1: a radius of the outer wall decreases in a circumferential direction from the inlet. Element 2: the outer wall has a first edge and a second edge, the outer wall extending circumferentially from the first edge to the second edge, the inlet defined radially between the first edge and the second edge. Element 3: the first edge is circumferentially aligned with the second edge. Element 4: the air outlet is fluidly connectable to the compressor of the gas turbine engine via an air conduit, the air conduit located radially inwardly of the plenum. Element 5: the splitter is defined by a splitter wall extending circumferentially around the central axis, the splitter wall having a curved portion curving radially inwardly from the splitter toward the central axis and a conduit portion extending from the curved portion and at least partially axially toward the inlet, the air conduit located radially between the inner wall and the splitter wall, an axial component of a direction of a flow in the plenum being opposite that in the conduit portion of the air conduit. Element 6: a radius of the inner wall of the plenum decreases in the flow direction. Element 7: a radius of the conduit portion of the splitter wall increases in the flow direction and away from the air outlet. Element 8: de-swirling vanes extending across the air conduit. Element 9: a radius of the outer wall decreases in a circumferential direction from the inlet. Element 10: the outer wall has a first edge and a second edge, the outer wall extending circumferentially from the first edge to the second edge, the inlet defined radially between the first edge and the second edge. Element 11: the first edge is circumferentially aligned with the second edge. Element 12: the air outlet is fluidly connectable to the compressor of the gas turbine engine via an air conduit, the air conduit located radially inwardly of the plenum. Element 13: the splitter wall has a curved portion curving radially inwardly from the splitter toward the central axis and a conduit portion extending from the curved portion and at least partially axially toward the inlet, the air conduit located radially between the inner wall and the splitter wall. Element 14: a radius of the inner wall of the plenum decreases in the flow direction. Element 15: a radius of the conduit portion of the splitter wall increases in the flow direction and away from the air outlet. Element 16: the particle outlet is in fluid flow communication with a blower, a blower oriented to draw particles out of the plenum.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An inertial particle separator (IPS) for a gas turbine engine, comprising:
    a plenum circumferentially extending about a central axis and defined between an outer wall and an inner wall, the outer wall being radially outward of the inner wall relative to the central axis,
    the plenum having an inlet facing a first circumferential direction relative to the central axis,
    a radius of the outer wall decreasing in a first axial direction relative to the central axis between the inlet and a splitter leading edge of an annular splitter, the splitter leading edge extending circumferentially around the central axis at a distance away from the inlet in the first axial direction, the splitter leading edge disposed radially between the outer wall and the inner wall,
    a particle outlet including an annulus defined radially between the outer wall and the splitter leading edge,
    an annular air outlet fluidly connectable to a compressor of the gas turbine engine and defined radially between the splitter leading edge and the inner wall,
    wherein the annular splitter is defined by a splitter wall extending circumferentially around the central axis, the splitter wall extending in the first axial direction from the splitter leading edge to a splitter curved portion curving radially inwardly from the splitter leading edge toward the central axis to a splitter conduit portion extending from the splitter curved portion at least partially in a second axial direction opposite to the first axial direction toward the inlet radially inward of the inner wall, and
    wherein an air conduit extending in the second axial direction is at least partially formed between the inner wall and the splitter conduit portion to fluidly connect the compressor of the gas turbine engine to the air outlet, an axial component of a direction of a flow in the plenum being opposite that in the air conduit.

2. The IPS of claim 1, wherein the radius of the outer wall decreases in a second circumferential opposite the first circumferential direction from the inlet.

3. The IPS of claim 2, wherein the outer wall has a first edge and a second edge, the outer wall extending circumferentially from the first edge to the second edge, the inlet defined radially between the first edge and the second edge.

4. The IPS of claim 3, wherein the first edge is circumferentially aligned with the second edge.

5. The IPS of claim 1, wherein a radius of the inner wall of the plenum decreases in the first axial direction.

6. The IPS of claim 1, wherein a radius of the litter conduit portion of the splitter wall increases in the second axial direction away from the air outlet.

7. The IPS of claim 1, further comprising de-swirling vanes extending across the air conduit.

8. An inertial particle separator (IPS) for a gas turbine engine, comprising:
    a plenum circumferentially extending about a central axis and defined between an outer wall and an inner wall radially inward of the outer wall relative to the central axis,
    the inner and outer walls circumferentially extending around the central axis,
    the plenum having an inlet oriented tangentially to the outer wall and facing a first circumferential direction relative to the central axis,
    a radius of the outer wall decreasing in a first axial direction between the inlet and a splitter leading edge of an annular splitter, the splitter leading edge extending circumferentially around the central axis at a distance away from the inlet in the first axial direction, the splitter leading edge disposed radially between the outer wall and the inner wall,
    wherein the annular splitter is defined by a splitter wall extending circumferentially around the central axis, the splitter wall extending in the first axial direction from the splitter leading edge to a splitter curved portion curving radially inwardly from the splitter leading edge toward the central axis to a splitter conduit portion extending from the splitter curved portion at least partially in a second axial direction opposite to the first axial direction toward the inlet radially inward of the inner wall,
    an air conduit extending in the second axial direction is at least partially formed between the inner wall and the splitter conduit portion to fluidly connect to a compressor of the gas turbine engine,
    an annular air outlet of the plenum fluidly connected to the air conduit and extending radial between the inner wall and the splitter leading edge, and
    a particle outlet defined by an annulus defined radially between the outer wall and the splitter leading edge,
    wherein an axial component of a direction of a flow in the plenum is opposite that in the air conduit.

9. The IPS of claim 8, wherein thig radius of the outer wall decreases from the inlet in a second circumferential direction opposite the first circumferential direction.

10. The IPS of claim 9, wherein the outer wall has a first edge and a second edge, the outer wall extending circumferentially from the first edge to the second edge, the inlet defined radially between the first edge and the second edge.

11. The IPS of claim 10, wherein the first edge is circumferentially aligned with the second edge.

12. The IPS of claim 8, wherein a radius of the inner wall of the plenum decreases in the first axial direction.

13. The IPS of claim 8, wherein a radius of the splitter conduit portion of the splitter wall increases in the second axial direction from the air outlet.

14. The IPS of claim 8, wherein the particle outlet is in fluid flow communication with a blower, the blower oriented to draw particles out of the plenum.

15. A method of separating particles from an airflow with an inertial particle separator (IPS) of a gas turbine engine, the IPS having a plenum defined between an outer wall and an inner wall radially inward of the outer wall relative to the central axis, the plenum annularly extending around a central axis of the gas turbine and having an inlet facing a first circumferential direction relative to the central axis, the method comprising:

receiving the airflow within the plenum in a second circumferential direction opposite the first circumferential direction relative to the central axis;

increasing a speed at which the airflow rotates about the central axis within the plenum thereby causing some of the particles to migrate radially away from the central axis with the outer wall having a radius decreasing in a first axial direction relative to the central axis between the inlet and a splitter leading edge of an annular splitter, the splitter leading edge extending circumferentially around the central axis at a distance away from the inlet in the first axial direction and disposed radially between the outer wall and the inner wall, the annular splitter defined by a splitter wall extending circumferentially around the central axis, the splitter wall extending in the first axial direction from the splitter leading edge to a splitter curved portion curving radially inwardly from the splitter leading edge toward the central axis to a splitter conduit portion extending from the splitter curved portion at least partially in a second axial direction opposite to the first axial direction toward the inlet radially inward of the inner wall; and directing a radially inner portion of the airflow toward a compressor of the gas turbine engine via an air conduit extending in the second axial direction and being at least partially formed between the inner wall and the splitter conduit portion to fluidly connect the compressor to an annular air outlet defined radially between the splitter leading edge and the inner wall, an axial component of a direction of a flow in the plenum being opposite that in the air conduit, and bleeding a radially outer portion of the flow containing at least some of the particles to an environment outside of the gas turbine engine via the particle outlet including an annulus defined radially between the outer wall and the splitter leading edge.

16. The method of claim 15, wherein increasing the speed includes circulating the airflow within the plenum having the outer wall decreasing in radius.

\* \* \* \* \*